United States Patent
Kim et al.

(10) Patent No.: US 10,468,673 B2
(45) Date of Patent: Nov. 5, 2019

(54) CATHODE ACTIVE MATERIAL FOR LITHIUM-ION SECONDARY BATTERIES, METHOD FOR PRODUCING SAME, AND LITHIUM-ION SECONDARY BATTERY COMPRISING SAME

(71) Applicant: Samsung SDI Co., Ltd., Yongin-si, Gyeonggi-do (KR)

(72) Inventors: Ji Yoon Kim, Suwon-si (KR); Dong Gyu Chang, Daejeon (KR); Jong Min Kim, Seoul (KR); Mi Sun Lee, Hwaseong-si (KR); Young Joo Chae, Anyang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 232 days.

(21) Appl. No.: 15/540,519

(22) PCT Filed: Aug. 21, 2015

(86) PCT No.: PCT/KR2015/008732
§ 371 (c)(1),
(2) Date: Aug. 1, 2017

(87) PCT Pub. No.: WO2016/108384
PCT Pub. Date: Jul. 7, 2016

(65) Prior Publication Data
US 2017/0358796 A1  Dec. 14, 2017

(30) Foreign Application Priority Data
Dec. 30, 2014  (KR) .................. 10-2014-0193323

(51) Int. Cl.
*H01M 4/36* (2006.01)
*H01M 4/485* (2010.01)
(Continued)

(52) U.S. Cl.
CPC .......... *H01M 4/366* (2013.01); *H01M 4/485* (2013.01); *H01M 4/525* (2013.01); *H01M 4/58* (2013.01);
(Continued)

(58) Field of Classification Search
CPC .......... H01M 10/052; H01M 10/0525; H01M 2004/021; H01M 2004/028; H01M 4/366; H01M 4/485; H01M 4/525; H01M 4/58
See application file for complete search history.

(56) References Cited

U.S. PATENT DOCUMENTS

2004/0258836 A1  12/2004  Besenhard et al.
2012/0270104 A1  10/2012  Paulsen et al.
(Continued)

FOREIGN PATENT DOCUMENTS

CN  102420331 A  4/2012
CN  102832389 A  12/2012
(Continued)

OTHER PUBLICATIONS

EPO Extended Search Report dated Sep. 21, 2018, for corresponding European Patent Application No. 15875478.8 (16 pages).
(Continued)

*Primary Examiner* — Carlos Barcena
(74) *Attorney, Agent, or Firm* — Lewis Roca Rothgerber Christie LLP

(57) ABSTRACT

Provided are a positive active material for a lithium secondary battery, a method of preparing the positive active material, and a lithium ion secondary battery including the positive active material, the positive active material including a lithium-containing compound represented by the formula of $Li_{2-x}M'O_{3-y}$ (wherein M' is at least one element selected from Mg, Al, Ca, Ti, V, Cr, Fe, Cu, Zn, Ga, Sr, Y, Zr, Nb, Mo, Ru, and F; $0 \le x \le 1$; and $0 \le y \le 3$) on a surface or
(Continued)

inside of a lithium metal oxide represented by the formula of $Li_{1-x}Ni_yM_{1-y}O_{2-z}$ (wherein M is at least one element selected from Co and Mn; $0 \leq x \leq 0.05$; $0.6 \leq y \leq 1$; and $0 \leq z \leq 0.05$).

8 Claims, 6 Drawing Sheets

(51) Int. Cl.
    *H01M 4/525*     (2010.01)
    *H01M 4/02*     (2006.01)
    *H01M 10/0525*     (2010.01)
    *H01M 4/58*     (2010.01)
    *H01M 10/052*     (2010.01)

(52) U.S. Cl.
    CPC ..... *H01M 10/052* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2013/0115513 A1 | 5/2013 | Choi et al. | |
| 2014/0377627 A1 | 12/2014 | Furuya et al. | |
| 2015/0132651 A1 | 5/2015 | Lee et al. | |
| 2015/0255789 A1* | 9/2015 | Bi | H01M 4/366 |
| | | | 429/223 |

FOREIGN PATENT DOCUMENTS

| | | |
|---|---|---|
| JP | 2010-225309 A | 10/2010 |
| JP | 2013-105727 A | 5/2013 |
| KR | 10-0693822 B1 | 3/2007 |
| KR | 10-2009-0013661 A | 2/2009 |
| KR | 10-2012-0093983 A | 8/2012 |
| KR | 10-2014-0058165 A | 5/2014 |
| KR | 10-2014-0084566 A | 7/2014 |

OTHER PUBLICATIONS

Creative commons: Commons Deed, S.Y. Lee, "A study of heteroelement substitution and surface modification for structural stability improvement of Ni-rich positive active material for lithium secondary batteries," Master's thesis of Korea University, Feb. 2013, 104 pages, English Abstract on pp. i-iii.

Xiong et al., "A modified LiF coating process to enhance the electrochemical performance characteristics of $LiNi_{0.8}Co_{0.1}Mn_{0.1}O_2$ cathode materials," Materials Letters, 2013, vol. 110, pp. 4-9.

EPO Partial Supplementary Search Report dated May 8, 2018, for corresponding European Patent Application No. 15875478.8 (16 pages).

* cited by examiner

CATHODE ACTIVE MATERIAL FOR LITHIUM-ION SECONDARY BATTERIES, METHOD FOR PRODUCING SAME, AND LITHIUM-ION SECONDARY BATTERY COMPRISING SAME

CROSS-REFERENCE TO RELATED APPLICATION(S)

This application is a National Phase Patent Application of International Patent Application Number PCT/KR2015/008732, filed on Aug. 21, 2015, which claims priority of Korean Patent Application 10-2014-0193323, filed Dec. 30, 2014. The entire contents of both of which are incorporated herein by reference.

TECHNICAL FIELD

The present disclosure relates to a positive active material for a lithium ion secondary battery, a method of preparing the positive active material, and a lithium ion secondary battery including the positive active material.

BACKGROUND ART

Along with rapid development toward portable, smaller size, lower weight, higher performance electronic devices in the electronic and information communication industries, there is an increasing demand for high-capacity and high-performance lithium secondary batteries as a power source for these electronic devices. Furthermore, along with commercialization of electric vehicles (EVs) or hybrid electric vehicles (HEVs), research into lithium secondary batteries having high capacity, high power output, and high stability has been vigorously conducted.

A lithium secondary battery may be manufactured by forming a negative electrode and a positive electrode using materials that allow intercalation and deintercalation of lithium ions and injecting an organic electrolyte solution or a polymer electrolyte solution between the negative electrode and the positive electrode. The lithium secondary battery may electric energy through oxidation and reduction reactions that take place as the intercalation and deintercalation of lithium ions occur in the negative and positive electrodes.

Of the ingredients of a lithium secondary battery, a material of the positive electrode is crucial in term of capacity and performance of the battery.

As the first commercialized positive electrode material, lithium cobalt oxide ($LiCoO_2$) has been mostly used till now due to good structural stability and ease of mass production, compared to other lithium transition metal oxides. However, this positive electrode material is expensive due to the limitation of cobalt as a natural resource, and is harmful to the human body.

For these reasons, positive electrode materials as alternatives to such lithium cobalt oxides have been studied in various aspects. In particular, a nickel (Ni)-rich positive active material, i.e., $LiNi_{1-x}M_xO_2$ (wherein $0 \leq x \leq 0.5$ and M may be, for example, Co or Mn), among other lithium metal oxides having a layered structure, may implement a high capacity of about 200 mAh/g or greater, and thus is considered a suitable positive electrode material for next-generation electric vehicles and power storages. Such Ni-rich positive active materials are less toxic to the human body and cost low, and thus have been studied with great interest.

However, Ni-rich positive active materials may cause swelling due to an increased surface residual lithium and generate gas through reaction with electrolyte solution.

For example, a general method of preparing a lithium metal oxide may include preparing a transition metal precursor, mixing the transition metal precursor with a lithium compound, and then calcining a resulting mixture. As the lithium compound, LiOH and/or $Li_2CO_3$ may be used. In order to facilitate crystalline structure formation, the thermal treatment is performed with an excess of the lithium-containing compound added, so that a large amount of the residual lithium as LiOH or $Li_2CO_3$ may remain unreacted on the surface of the positive active material. Such a residual lithium, i.e., the unreacted LiOH or $Li_2CO_3$ may cause gasification and swelling through reaction with an electrolyte solution in the battery, leading to a severe reduction in high-temperature stability.

Patent document 1 discloses a method of suppressing a side reaction between a Ni-rich positive active material and an electrolyte solution by uniformly coating a silicon oxide on the surface of the Ni-rich positive active material. According to Patent document 1, a method of preparing a positive active material may include: preparing a coating solution including a silicon oxide; adding a Ni-rich lithium metal composite oxide having a Ni content of 50% or greater to the coating solution and stirring a resulting solution to coat the silicon oxide on a surface of the lithium metal composite oxide; and thermally treating the lithium metal composite oxide including the silicon oxide coated on the surface thereof at a temperature of about 400° C. to 600° C.

Non-patent document 1 discloses a method of coating a Ni-rich positive active material ($LiNi_{0.6}Co_{0.2}Mn_{0.2}O_2$) with a metal oxide ($Al_2O_3$ or $TiO_2$) or a metal fluoride ($AlF_3$) by impregnation and calcining at a temperature of about 450° C.

However, the above-described methods use a wet coating process with a solvent in a positive active material coating process, and thus require an additional drying process after the coating, wherein partially non-uniform coating may occur depending on the conditions of stirring in the drying process, leading to reduced performance improvement. In addition, such simply mixing the coating material and the positive active material may lower coating uniformity, and may also reduce electric conductivity due to the heat treatment at a low temperature after the mixing. Furthermore, the coating material remaining exposed on the surface of the positive active material may lower high-rate characteristics of a battery.

PRIOR ART DOCUMENT

Patent Document (Patent document 1) KR2014-0084566 A

Non-Patent Document (Non-patent document 1) A study of heteroelement substitution and surface modification for structural stability improvement of Ni-rich positive active material for lithium secondary batteries, by S. Y. LEE, Master's thesis of Korea University (February in 2013).

DETAILED DESCRIPTION OF THE INVENTION

Technical Problem

The present invention provides a positive active material that may include a lithium-containing compound having good electric conductivity and ionic conductivity on a surface or inside of a lithium metal oxide, and thus may improve battery performance in terms of charge and discharge capacity, initial efficiency, high-rate characteristics, and lifetime characteristics.

The present invention provides a method of preparing the positive active material, the method including a high-temperature thermal treatment process after high-speed coating.

The present invention provides a lithium secondary battery including the positive active material.

Technical Solution

According to an aspect of the present invention, a positive active material for a lithium secondary battery includes a lithium-containing compound represented by Formula 2 on a surface or inside of a lithium metal oxide represented by Formula 1:

[Formula 1]

wherein, in Formula 1, M is at least one element selected from Co and Mn; $0 \leq x \leq 0.05$; $0.6 \leq y \leq 1$; and $0 \leq z \leq 0.05$, and

[Formula 2]

wherein, in Formula 2, M' is at least one element selected from Mg, Al, Ca, Ti, V, Cr, Fe, Cu, Zn, Ga, Sr, Y, Zr, Nb, Mo, Ru, and F; $0 \leq x \leq 1$; and $0 \leq y \leq 3$.

In some embodiments, the lithium-containing compound represented by Formula 2 may be in the form of particles or a layer. The lithium-containing compound represented by Formula 2 may be formed by reaction of a metal oxide or a fluorine-containing compound with a residual lithium on the surface or inside of the lithium metal oxide represented by Formula 1.

In some embodiments, the metal oxide may be an oxide including at least one metal selected from the group consisting of Mg, Al, Ca, Ti, V, Cr, Fe, Cu, Zn, Ga, Sr, Y, Zr, Nb, Mo, and Ru. For example, the metal oxide may be at least one selected from the group consisting of MgO, $Al_2O_3$, CaO, $TiO_2$, $V_2O_5$, $Cr_2O_3$, $Fe_2O_3$, CuO, ZnO, $Ga_2O_3$, SrO, $Y_2O_3$, $ZrO_2$, $NbO_2$, $MoO_3$, and $RuO_2$.

In some embodiments, the fluorine-containing compound may be at least one selected from the group consisting of NaF, $NH_3F$, and PVDF.

In some embodiments, an amount of the lithium-containing compound represented by Formula 2 may be in a range of about 0.01 part by weight to about 1.0 part by weight with respect to 100 parts by weight of the lithium metal oxide. The lithium-containing compound represented by Formula 2 may be in the form of particles having an average particle diameter (D50) of about 20 nm to about 200 nm.

According to one or more embodiments, a method of preparing a positive active material for a lithium secondary battery includes: coating a lithium metal oxide represented by Formula 1 and having a layered structure with at least one coating material selected from a metal oxide and a fluorine-containing compound by stirring the lithium metal oxide and the at least one coating material at about 8,000 rpm to about 20,000 rpm; and thermally treating at about 800° C. to 1,000° C. a resulting powder from the coating step to form a lithium-containing compound represented by Formula 2 on the surface or inside of the lithium metal oxide.

In some embodiments, in the coating of the lithium metal oxide, the stirring may be performed for about 10 seconds to about 60 seconds. The coating may be performed by dry coating.

In some embodiments, in the thermal treating, the at least one coating material may react with a residual lithium on the surface or inside of the lithium metal oxide, thereby to form the lithium-containing compound represented by Formula 2 on the surface or inside of the lithium metal oxide. An amount of the residual lithium after the thermal treating may be reduced by about 10% to about 20%, compared to that when the lithium metal oxide represented by Formula 1 is heated alone.

According to one or more embodiments, a lithium secondary battery includes any of the positive active materials according to the above-described embodiments or a positive active material prepared according to any of the methods according to the above-described embodiments.

Advantageous Effects of the Invention

As described above, according to the one or more embodiments, a positive active material may include a lithium-containing compound of Formula 2 having good electric conductivity and ionic conductivity on a surface or inside of a lithium metal oxide represented by Formula 1, and thus may improve battery performance in terms of charge and discharge capacity, initial efficiency, high-rate characteristics, and lifetime characteristics.

According to the one or more embodiments, a method of preparing the positive active material may include coating the surface or inside of the Ni-rich positive active material with at least one selected from a metal oxide and a fluorine-containing compound by stirring the lithium metal oxide and the at least one coating material at a high speed of about 8,000 rpm, so that the Ni-rich positive active material may be uniformly coated with the at least coating material, thus solving a problem of battery performance reduction caused by non-uniform coating.

The method may also include a high-temperature thermal treatment by which the lithium-containing compound of Formula 2 may be formed through reaction between the residual lithium remaining on the surface or inside of the Ni-rich positive active material and the at least one coating material, thus providing an additional effect of reducing the residual lithium which may generate gas and reduce thermal stability.

MODE OF THE INVENTION

Figure 1:
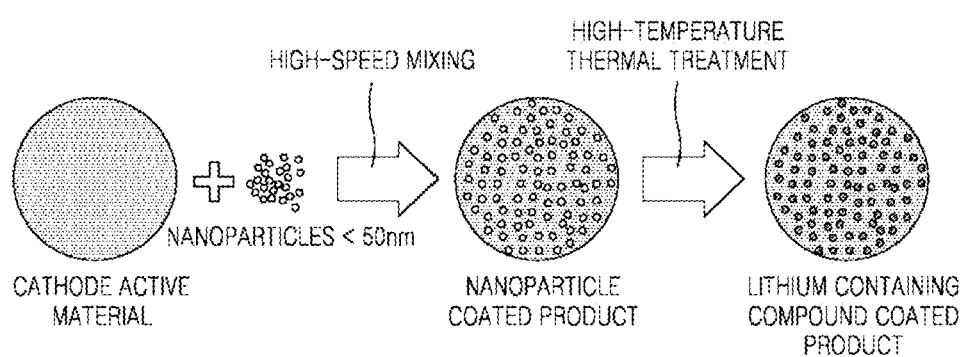
FIG. 1 is a schematic view illustrating a method of preparing a positive active material for a lithium secondary battery in sequence, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

According to an aspect of the present disclosure, a positive active material for a lithium secondary battery includes a lithium-containing compound represented by Formula 2 on a surface or inside of a lithium metal oxide represented by Formula 1.

$$Li_{1-x}Ni_yM_{1-y}O_{2-z}$$ [Formula 1]

In Formula 1, M is at least one element selected from Co and Mn; $0 \leq x \leq 0.05$; $0.6 \leq y \leq 1$; and $0 \leq z \leq 0.05$.

$$Li_{2-x}M'O_{3-y}$$ [Formula 2]

In Formula 2, M' is at least one element selected from Mg, Al, Ca, Ti, V, Cr, Fe, Cu, Zn, Ga, Sr, Y, Zr, Nb, Mo, Ru, and F; $0 \leq x \leq 1$; and $0 \leq y \leq 3$.

The lithium metal oxide represented by Formula 1 may be a Ni-rich active material having a Ni content of about 60 mole % or greater. Such a Ni-rich active material may implement high-rate charge and discharge characteristics and high-rate output characteristics. In particular, the higher the Ni content, the higher the energy density and the more advantageous it is in terms of costs.

Figure 2:
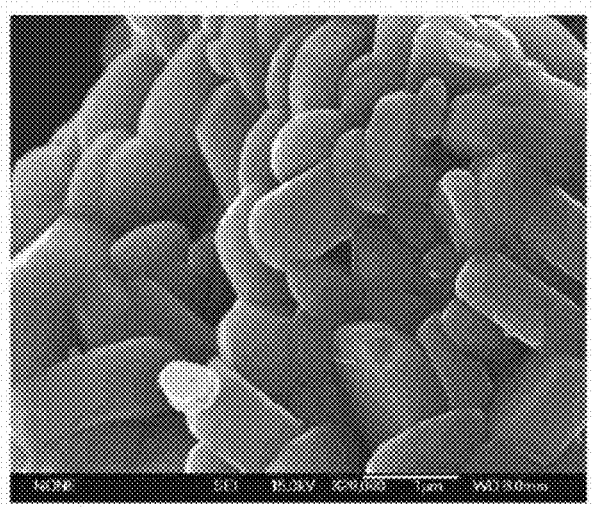
FIG. 2 is a magnified scanning electron microscope (SEM) image at 20,000× of a positive active material prepared in Example 1.
Figure 3:
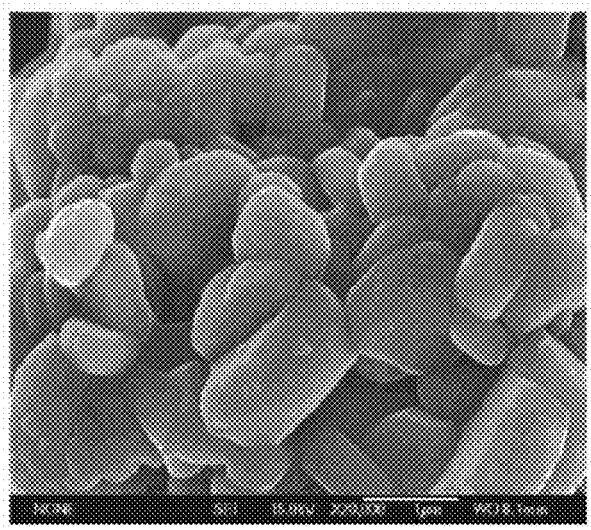
FIG. 3 is a magnified SEM image at 20,000× of a positive active material prepared in Example 2.

The lithium metal oxide represented by Formula 1 may be in the form of secondary particles resulting from agglomeration of primary particles, with a residual lithium remaining on the surface of the secondary particles or in the space between the primary particles or the surface thereof constituting the secondary particles. As used herein, the "surface of the lithium metal oxide" may refer to the "surface of the secondary particles," and the "inside of the lithium metal oxide" may refer to the "space between the primary particles or the surface thereof constituting the secondary particles." The lithium-containing compound represented by Formula 2 may be formed by reaction of the metal oxide or fluorine-containing compound with the residual lithium on the surface or inside of the lithium metal oxide represented by Formula 1. In some embodiments, the lithium-containing compound of Formula 2 may be in the form of particles on the surface or inside of the primary particles constituting the secondary particles or on the surface of the secondary particles. In some other embodiments, the lithium-containing compound of Formula 2 may be in the form of a layer on the surface of the primary particles or on the surface of the secondary particles. As embodiments, the lithium-containing compound of Formula 2 in the form of a layer, and the lithium-containing compound of Formula 2 in the form of particles are illustrated in FIGS. 2 and 3, respectively.

The metal oxide may be an oxide including at least one metal element selected from the group consisting of Mg, Al, Ca, Ti, V, Cr, Fe, Cu, Zn, Ga, Sr, Y, Zr, Nb, Mo, and Ru. For example, the metal oxide may be at least one selected from among MgO, $Al_2O_3$, CaO, $TiO_2$, $V_2O_5$, $Cr_2O_3$, $Fe_2O_3$, CuO, ZnO, $Ga_2O_3$, SrO, $Y_2O_3$, $ZrO_2$, $NbO_2$, $MoO_3$, and $RuO_2$. The fluorine-containing compound may be at least one selected from NaF, $NH_3F$, and PVDF.

The amount of the lithium-containing compound represented by Formula 2 may be in a range of about 0.01 part by weight to 1.0 part by weight with respect to 100 parts by weight of the lithium metal oxide. When the amount of the lithium-containing compound is less than 0.01 part by weight, it may be insufficient to completely coat the surface of the positive active material, failing to attain a satisfactory effect from the coating. On the other hand, when the amount of the lithium-containing compound exceeds 1.0 part by weight, battery capacity may be slightly reduced.

For example, the lithium-containing compound represented by Formula 2 may have an average particle diameter (D50) of about 20 nm to about 200 nm. When the average particle diameter (D50) of the lithium-containing compound is less than 20 nm, it may be difficult to synthesize a coating material itself having a particle diameter less than 20 nm, and also to properly coat the coating material on the positive active material due to severe agglomeration between the coating material. When the average particle diameter of the lithium-containing compound exceeds 200 nm, due to an unsuitable particle size ratio of the lithium-containing compound to the positive active material, the surface of the positive active material may not be uniformly coated with a reduced effect of shear stress on the coating. The average particle diameter (D50) refers to a diameter corresponding to 50 volume % (i.e., the particle diameter or median diameter at a 50% cumulative volume) in a particle size distribution measured by laser diffraction.

According to another aspect of the present disclosure, a method of preparing a positive active material for a lithium secondary battery includes: coating a lithium metal oxide represented by Formula 1 and having a layered structure with at least one coating material selected from a metal oxide and a fluorine-containing compound by stirring the lithium metal oxide and the at least one coating material at about 8,000 rpm to about 20,000 rpm; and thermally treating at about 800° C. to 1,000° C. a resulting powder from the coating step to form a lithium-containing compound represented by Formula 2 on the surface or inside of the lithium metal oxide.

$$Li_{1-x}Ni_yM_{1-y}O_{2-z}$$ [Formula 1]

In Formula 1, M is at least one element selected from Co and Mn; $0 \leq x \leq 0.05$; $0.6 \leq y \leq 1$; and $0 \leq z \leq 0.05$.

$$Li_{2-x}M'O_{3-y}$$ [Formula 2]

In Formula 2, M' is at least one element selected from Mg, Al, Ca, Ti, V, Cr, Fe, Cu, Zn, Ga, Sr, Y, Zr, Nb, Mo, Ru, and F; $0 \leq x \leq 1$; and $0 \leq y \leq 3$.

Types of the metal oxide and the fluorine-containing compound which may be used as the coating material are the same as those described above.

An added amount of the coating material may be in a range of about 0.01 part by weight to about 1.0 part by weight with respect to 100 parts by weight of the lithium metal oxide. When the amount of the coating material added is less than 0.01 part by weight, it may be insufficient to completely coat the surface of the positive active material, failing to attain a satisfactory coating effect. On the other hand, when the amount of the coating material added exceeds 1.0 part by weight, reductions in capacity and high-rate characteristics may likely occur.

The coating material may have an average particle diameter (D50) of about 20 nm to about 200 nm. When the average particle diameter (D50) of the coating material is less than 20 nm, it may be difficult to synthesize the coating material itself having a particle diameter less than 20 nm, and also to properly coat the metal oxide on the positive active material due to severe agglomeration between the coating material. When the average particle diameter of the coating material exceeds 200 nm, due to an unsuitable particle size ratio of the coating material to the positive active material, the surface of the positive active material may not be uniformly coated with a reduced effect of shear stress on the coating. The average particle diameter (D50) refers to a diameter corresponding to 50 volume % (i.e., the particle diameter or median diameter at a 50% cumulative volume) in a particle size distribution measured by laser diffraction.

The coating may be performed while stirring at a speed of about 8,000 rpm to about 20,000 rpm. Since the stirring is performed at such a high speed of about 8,000 rpm, the coating material may be uniformly coated on the positive active material even in a short stirring time of 1 minute or less. The high-speed stirring may cause disaggregation of the positive active material, so that it is unnecessary to perform an additional process of disaggregating particles aggregated during a high-temperature calcination process (heat treatment). On the other hand, when the stirring speed exceeds 20,000 rpm, cost-effectiveness may be low, and the positive active material itself may crack. Accordingly, the stirring may be performed at a speed of about 20,000 rpm or less. For example, a stirring time of about 10 seconds to about 60 seconds may be enough.

The coating may be performed by dry coating. Dry coating may be advantageous as it does not require an additional solvent drying process that is necessarily required after wet coating. Furthermore, the dry coating may not cause drawbacks of wet drying, such as non-uniform coating which may likely occur depending on the stirring conditions in the solvent drying process, and a consequential reduction in battery performance.

After the coating, the resulting powder may be thermally treated at a temperature of about 800° C. to about 1000° C. When the thermal treatment temperature exceeds 1,000° C., the Ni-rich positive active material may be deteriorated due to such a high temperature thermal treatment. On the other hand, when the thermal treatment temperature is less than 800° C., an increased proportion of the coating material may more likely remain in the form of a metal oxide or a fluorine-containing compound on the surface of the lithium metal oxide, not converted into the lithium-containing compound represented by Formula 2, thus reducing a high-rate characteristic improvement effect.

For example, when $Al_2O_3$ is used as the coating material, $Li_2CO_3$ as a residual lithium present on the surface or inside of the positive active material may react with the coating material, thus generating $LiAlO_2$ on the surface of the positive active material, as represented by Reaction Scheme (1).

$$Li_2CO_3 + Al_2O_3 \rightarrow 2LiAlO_2 + CO_2 \quad (1)$$

Figure 6:
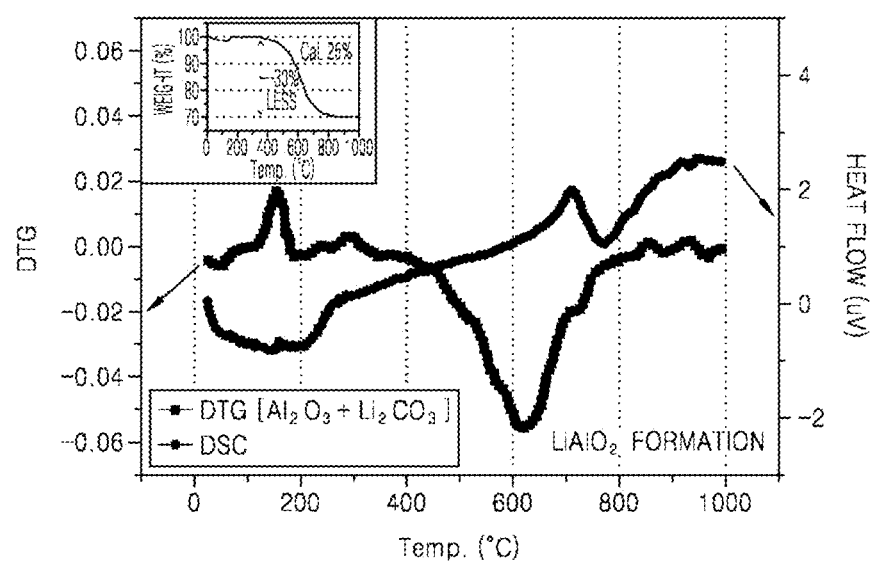
FIG. 6 is a graph illustrating results of analyzing the positive active material of Example 1 by derivative thermogravimetry (DTG) and differential scanning calorimetry (DSC).

The reaction represented by Reaction Scheme (1) may take place in a temperature range of about 500° C. to about 800° C., as can be seen from a result of evaluating a positive active material prepared in Example 1 (to be described below) by derivative thermogravimetry (DTG) and differential scanning calorimetry (DSC) shown in FIG. 6. Thus, according to embodiments, to form the lithium-containing compound represented by Formula 2 on the surface or inside of the Ni-rich lithium metal oxide of Formula 1, the thermal treatment may be performed at a high temperature of 800° C. or greater.

That is, through the thermal treatment step, the coating material may form a lithium-containing compound represented by Formula 2 by reaction with the residual lithium remaining on the surface or inside of the lithium metal oxide of Formula 1. For reference, the residual lithium may refer to LiOH or $Li_2CO_3$ remaining unreacted on the surface or inside of the lithium metal oxide after the thermal treatment. In Reaction Scheme (1) above, $Li_2CO_3$ is represented as an example of the residual lithium.

After the thermal treatment, the amount of the residual lithium may be reduced by about 10% to 20%, as compared to when only lithium metal oxide represented by Formula 1 was thermally treated.

The lithium-containing compound may be at least one selected from the group consisting of $Li_2MgO_2$, $LiAlO_2$, $Li_2CaO_2$, $Li_2TiO_3$, $LiVO_3$, $LiCrO_2$, $LiFeO_2$, $Li_2CuO_2$, $Li_2ZnO_2$, $LiGaO_2$, $Li_2SrO_2$, $LiYO_2$, $Li_2ZrO_3$, $Li_2NbO_3$, $Li_2MoO_4$, $Li_2RuO_3$, and LiF. The amount of the lithium-containing compound may be in a range of about 0.01 part by weight to about 1.0 part by weight with respect to 100 parts by weight of the lithium metal oxide. When the amount of the lithium-containing compound is less than 0.01 part by weight, it may be difficult to attain a satisfactory coating effect. On the other hand, when the amount of the lithium-containing compound exceeds 1.0 part by weight, battery capacity may be reduced.

According to another aspect of the present disclosure, a lithium secondary battery includes a positive active material according to any of the above-described embodiment or a positive active material prepared according to any of the above-described embodiments. For example, the lithium secondary battery may include a positive electrode including the positive active material, a negative electrode including the negative active material, a separator, and a non-aqueous electrolyte solution. The structure of a lithium secondary battery and a method of manufacturing the same are known in the art, and appropriate structures of a lithium secondary battery and manufacturing methods thereof will be chosen within the scope of the present inventive concept.

For example, the positive electrode may be manufactured by coating on a positive current collector a positive active material composition including a positive active material according to any of the above-described embodiments, and a binder, drying the coated composition, and roll-pressing a resulting product.

The binder may bind the positive active material and fix the positive active material to the current collector. The binder is not specifically limited, and may be any binders available in the art. For example, the binder may be at least one selected from polyvinylidenefluoride, polytetrafluoroethylene, polyvinylchloride, polyvinylpyrrolidone, polyvinylalcohol, carboxymethyl cellulose (CMC), starch, hydroxypropyl cellulose, polyethylene, polypropylene, a styrene-butadiene rubber, and a fluoride rubber.

Optionally, the positive active material composition may be prepared by further adding a solvent such as N-methyl-2-pyrrolidone (NMP); an olefin polymer such as polyethylene or polypropylene; or a filler including a fibrous material such as glass fiber or carbon fiber, into the positive active material and the binder. The positive active material composition may further include a conducting agent which is known in the art, for example, hard carbon, graphite, or carbon fiber.

The positive current collector is not particularly limited as long as it does not cause a chemical change in a battery and has conductivity. Examples of a material for forming the positive current collector are copper, stainless steel, aluminum, nickel, titanium, calcined carbon; copper and stainless steel that are surface-treated with carbon, nickel, titanium, silver, or the like; an alloy of aluminum and cadmium, or the like. The positive current collector may be in any of various forms, including a film, a sheet, a foil, a net, a porous structure, a foam, a non-woven structure, or the like.

The negative electrode may be manufactured by coating on a negative current collector a negative active material composition including a negative active material, drying the coated composition, and roll-pressing a resulting product. In some embodiments, the negative electrode may be a lithium metal. Optionally, the negative active material composition may further include a binder as described above, and a conducting agent.

The negative active material may be a carbonaceous material, for example, artificial graphite, natural graphite, graphitized carbon fiber, or amorphous carbon; a metal compound that is alloyable with, for example, lithium (Li), silicon (Si), aluminum (Al), tin (Sn), lead (Pb), zinc (Zn), bismuth (Bi), indium (In), manganese (Mg), gallium (Ga), cadmium (Cd), a silicon alloy, a tin alloy, or an aluminum alloy; or a composite of any one of the above-listed carbonaceous materials and any one of the above-listed metal compounds.

The negative current collector is not particularly limited as long as it does not cause a chemical change in a battery and has conductivity. Examples of a material for forming the negative current collector are copper, stainless steel, aluminum, nickel, titanium, calcined carbon; copper and stainless steel that are surface-treated with carbon, nickel, titanium, silver, or the like; an alloy of aluminum and cadmium, or the like. The negative current collector may be in any of various forms, including a film, a sheet, a foil, a net, a porous structure, a foam, a non-woven structure, or the like.

The separator may be placed between the negative electrode and the positive electrode. In some embodiments, the separator may be a common porous polymer film conventionally used as a separator, for example, may be a single layer or a stack of porous polymer films formed of polyolefin polymers such as an ethylene homopolymer, a propylene homopolymer, an ethylene/butene copolymer, an ethylene/hexene copolymer, and an ethylene/methacrylate copolymer. In some other embodiment, as the separator, a common porous non-woven fabric, for example, made of a high-melting point glass fiber or a polyethylene terephthalate fiber.

The non-aqueous electrolyte solution may include an electrolyte solution and a lithium salt. The electrolyte solution may include a non-aqueous electrolyte solution, an organic solid electrolyte, an inorganic solid electrolyte, or the like. However, embodiments are not limited thereto.

As the non-aqueous organic solvent, an aprotic organic solvent may be used. Examples of the aprotic organic solvent are N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofurane, dimethylsulfoxide, 1,3-dioxorane, formamide, dimethylformamide, dioxolane, acetonitrile, nitromethane, methyl formate, methyl acetate, triester phosphoric acid, trimethoxy methane, a dioxolan derivative, sulfolane, methyl sulfolane, 1,3-dimethyl-2-imidazolidinone, a propylene carbonate derivative, a tetrahydrofurane derivative, ether, methyl propionic acid, ethyl propionic acid, or the like.

Examples of the organic solid electrolyte are a polyethylene derivative, a polyethylene oxide derivative, a polypropylene oxide derivative, a phosphate ester polymer, polyagitation lysine, polyester sulfide, polyvinyl alcohol, polyfluorinated vinylidene, a polymer having a dissociable ionic group, or the like.

Examples of the inorganic solid electrolyte are nitrides, halides, and sulfides of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, or the like.

The lithium salt may be a material soluble in such a non-aqueous electrolyte as listed above, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower lithium aliphatic carbonate, lithium terphenylborate, and lithium imide, or the like.

The lithium secondary battery may be classified as either a cylindrical-type, rectangular-type, coin-type, or pouch-type according to a shape thereof. A lithium secondary battery according to any of the embodiments may have any of these shapes. These structures of a lithium secondary battery and methods of manufacturing the same are known, and a detailed description thereof will be omitted.

One or more embodiments of the present disclosure will now be described in detail with reference to the following examples. However, these examples are only for illustrative purposes and are not intended to limit the scope of the one or more embodiments of the present disclosure.

Example 1

100 g of $LiNi_{0.6}Co_{0.2}Mn_{0.2}O_2$ as a lithium metal oxide, and 0.2 g of $Al_2O_3$ nanoparticles as metal oxide particles having an average particle diameter (D50) of about 50 nm were put into a dry powder mixer (Nobilta-mini, available from Hosokawa Micron Corporation), and mixed together at a rate of about 14,000 rpm for about 30 seconds to obtain $LiNi_{0.6}Co_{0.2}Mn_{0.2}O_2$ powder coated with $Al_2O_3$ nanoparticles.

The resulting powder was thermally treated at about 820° C. for about 5 hours, thereby preparing a positive active material including $LiAlO_2$ coated on the surface of the $LiNi_{0.6}Co_{0.2}Mn_{0.2}O_2$. A magnified scanning electron microscope (SEM) image (at 20,000×) of the prepared positive active material is shown in FIG. 2.

Example 2

A positive active material including $Li_2ZrO_3$, instead of $LiAlO_2$, coated on the surface of $LiNi_{0.6}Co_{0.2}Mn_{0.2}O_2$ was prepared in the same manner as in Example 1, except that $ZrO_2$ nanoparticles were used instead of $Al_2O_3$ nanoparticles. A magnified SEM image (at 20,000×) of the prepared positive active material is shown in FIG. 3.

Comparative Example 1

Figure 4:
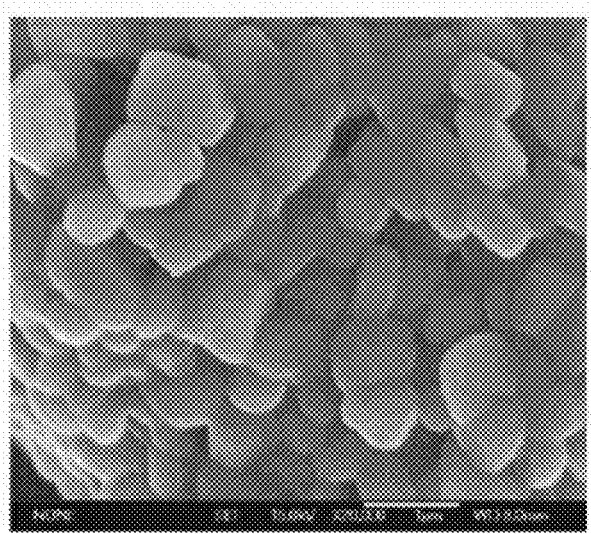
FIG. 4 is a magnified SEM image at 20,000× of a positive active material of Comparative Example 1.

$LiNi_{0.6}Co_{0.2}Mn_{0.2}O_2$ was used as a positive active material. A magnified SEM image (at 20,000×) of this positive active material is shown in FIG. 4.

Comparative Example 2

Figure 5:
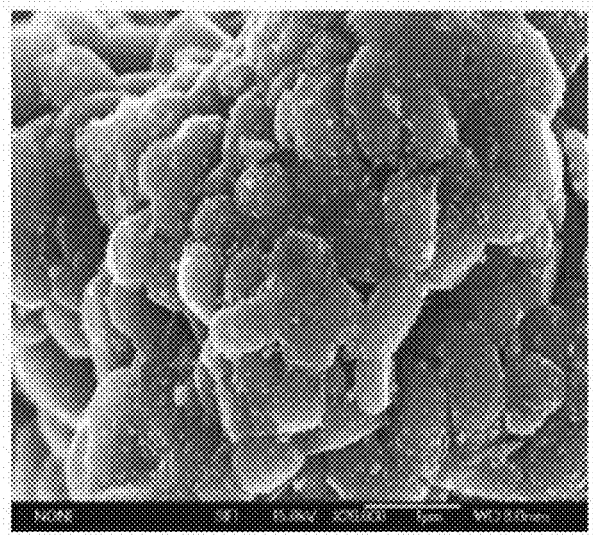
FIG. 5 is a magnified SEM image at 20,000× of a positive active material of Comparative Example 2.

A positive active material was prepared in the same manner as in Example 1, except that the thermal treatment temperature was controlled to about 400° C. The prepared positive active material included $Al_2O_3$ nanoparticles coated on the surface of $LiNi_{0.6}Co_{0.2}Mn_{0.2}O_2$. Due to the thermal treatment temperature lower than the temperature range of about 500° C. to about 800° C. in which the residual lithium forms $LiAlO_2$ particles by reaction with $Al_2O_3$, $Al_2O_3$ nanoparticles remained coated on the surface of $LiNi_{0.6}Co_{0.2}Mn_{0.2}O_2$, failing to be converted into $LiAlO_2$. A magnified SEM image (at 20,000×) of the prepared positive active material is shown in FIG. 5.

<Manufacture of Lithium Secondary Battery>

Each one of the positive active materials prepared in Examples 1 and 2 and Comparative Examples 1 and 2, Denka Black as a conducting agent, and polyvinylidene fluoride (PVDF) as a binder were mixed in a ratio of about 94:3:3 (w/w). The resulting mixture was coated on an Al foil to manufacture a positive electrode plate. A coin cell was manufactured using the positive electrolyte plate, a lithium metal as a negative electrode, a solution of 1.3M $LiPF_6$ in a mixture of EC, DMC, and DEC (in a ratio of about 3:4:3) as an electrolyte.

<Evaluation Methods>

1. Initial Efficiency (%) and Lifetime Characteristics (%)

Each of the manufactured coin cells was charged at a temperature of about 25° C. with a charge current of about 0.1C until a cutoff voltage of about 4.3V was reached, and then discharged with a discharge current of about 0.1C until a cutoff voltage of about 2.8V was reached, thereby completing a $1^{st}$ cycle. After the $1^{st}$ cycle, charging and discharging with a current of about 1.0C were repeated 50 times. The initial efficiency of each of the coin cells was calculated using Equation (1), and the capacity retention was calculated using Equation (2) to evaluate lifetime characteristics. The results are shown in Table 1.

Initial efficiency (%)=(Discharge capacity at $1^{st}$ cycle/Charge capacity at $1^{st}$ cycle)×100     (1)

Capacity retention (%)=(Discharge capacity at $50^{th}$ cycle/Discharge capacity at $1^{st}$ cycle)×100     (2)

2. Residual Lithium

Each one of the positive active materials in powder prepared in Examples 1 and 2 and Comparative Examples 1 and 2 was dissolved in water, followed by titration with hydrochloric acid (HCl) to calculate the amounts of LiOH and $Li_2CO_3$ included in the positive active material powder. The amount of a residual lithium remaining on the surface or inside of the lithium metal oxide was calculated (based on the amount of $Li_2CO_3$). The results are shown in Table 1.

TABLE 1

| Example | $1^{st}$ cycle (mAh/g) Charge capacity | $1^{st}$ cycle (mAh/g) Discharge capacity | Initial efficiency (%) | Lifetime characteristic (%) | Residual lithium (ppm) |
|---|---|---|---|---|---|
| Example 1 | 196.4 | 183.8 | 93.6 | 97.2 | 949 |
| Example 2 | 196.5 | 183.2 | 93.3 | 97.1 | 960 |
| Comparative Example 1 | 195.2 | 180.8 | 92.6 | 95.1 | 1072 |
| Comparative Example 2 | 195.6 | 182.5 | 93.3 | 95.3 | 1048 |

Referring to Table 1, the lithium secondary batteries manufactured using the positive active materials of Examples 1 and 2 were found to have improved charge and discharge capacity, improved initial efficiency, improved lifetime characteristics, and a remarkably reduced residual lithium content, compared to those manufactured using the positive active materials of Comparative Examples 1 and 2.

3. Rate Characteristics Evaluation

A charge-discharge test was performed on each of the manufactured coin cells by charging at a temperature of about 25° C. with a charge current of about 0.1C until a cutoff voltage of about 4.3V was reached, and discharging with a discharge current of about 0.1C until a cutoff voltage of about 3.0V was reached. The discharge capacities at different C-rates, and rate characteristics (%) as a ratio of discharge capacity at each C-rate to discharge capacity at 0.1C are shown in Table 2.

TABLE 2

| Example | Discharge capacity at different C-rate (mAh/g) | | | | | Rate characteristics (%) | | | |
|---|---|---|---|---|---|---|---|---|---|
| | 0.1 C | 0.2 C | 1 C | 2 C | 3 C | 0.2 C/0.1 C | 1 C/0.1 C | 2 C/0.1 C | 3 C/0.1 C |
| Example 1 | 183.8 | 180.1 | 168.6 | 161.8 | 156.2 | 98.0 | 91.7 | 88.0 | 85.0 |
| Example 2 | 183.2 | 179.5 | 168.1 | 161.3 | 155.2 | 98.0 | 91.7 | 88.0 | 84.7 |
| Comparative Example 1 | 180.8 | 177.3 | 165.9 | 158.0 | 151.2 | 98.1 | 91.8 | 87.4 | 83.6 |
| Comparative Example 2 | 182.5 | 178.9 | 167.0 | 158.2 | 150.7 | 98.0 | 91.5 | 86.7 | 82.5 |

Referring to Table 2, the lithium secondary batteries manufactured using the positive active materials of Examples 1 and 2 were found to have higher discharge capacities at different C-rates, and improved high-rate characteristics at 2C or greater, compared to the lithium secondary batteries manufactured using the positive active materials of Comparative Examples 1 and 2.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

The invention claimed is:

1. A method of preparing a positive active material for a lithium secondary battery, the method comprising:

coating a lithium metal oxide represented by Formula 1 and having a layered structure with at least one coating material selected from a metal oxide and a fluorine-containing compound by stirring the lithium metal oxide and the at least one coating material at about 8,000 rpm to about 20,000 rpm; and thermally treating at about 800° C. to 1,000° C. a resulting powder from the coating step to form a lithium-containing compound represented by Formula 2 on the surface or inside of the lithium metal oxide:

$$Li_{1-x}Ni_yM_{1-y}O_{2-z}$$ [Formula 1]

wherein, in Formula 1, M is at least one element selected from Co and Mn; $0 \leq x \leq 0.05$; $0.6 \leq y \leq 1$; and $0 \leq z \leq 0.05$, and $$Li_{2-x}M'O_{3-y}$$ [Formula 2]

wherein, in Formula 2, M' is at least one element selected from Mg, Al, Ca, Ti, V, Cr, Fe, Cu, Zn, Ga, Sr, Y, Zr, Nb, Mo, Ru, and F; $0 \leq x \leq 1$; and $0 \leq y \leq 3$.

2. The method of claim 1, wherein, in the coating of the lithium metal oxide, the stirring is performed for about 10 seconds to about 60 seconds.

3. The method of claim 1, wherein the coating is performed by dry coating.

4. The method of claim 1, wherein, in the thermal treating, the at least one coating material reacts with a residual lithium on the surface or inside of the lithium metal oxide, thereby to form the lithium-containing compound represented by Formula 2 on the surface or inside of the lithium metal oxide.

5. The method of claim 4, wherein an amount of the residual lithium after the thermal treating is reduced by about 10% to about 20%, compared to that when the lithium metal oxide represented by Formula 1 is heated alone.

6. The method of claim 1, wherein the metal oxide is an oxide including at least one metal element selected from the group consisting of Mg, Al, Ca, Ti, V, Cr, Fe, Cu, Zn, Ga, Sr, Y, Zr, Nb, Mo, and Ru.

7. The method of claim 1, wherein the metal oxide is at least one selected from the group consisting of MgO, $Al_2O_3$, CaO, $TiO_2$, $V_2O_5$, $Cr_2O_3$, $Fe_2O_3$, CuO, ZnO, $Ga_2O_3$, SrO, $Y_2O_3$, $ZrO_2$, $NbO_2$, $MoO_3$, and $RuO_2$.

8. The method of claim 1, wherein the fluorine-containing compound is at least one selected from the group consisting of NaF, $NH_3F$, and PVDF.

* * * * *